United States Patent
Gassmann

(10) Patent No.: US 8,596,439 B2
(45) Date of Patent: Dec. 3, 2013

(54) HYDRAULIC ASSEMBLY FOR A FORCE-OPERATED SETTING UNIT

(75) Inventor: Theodor Gassmann, Siegburg (DE)

(73) Assignee: GKN Driveline International GmbH, Lohmar (DE)

(*) Notice: Subject to any disclaimer, the term of this patent is extended or adjusted under 35 U.S.C. 154(b) by 289 days.

(21) Appl. No.: 12/811,032

(22) PCT Filed: Dec. 6, 2008

(86) PCT No.: PCT/EP2008/010363
§ 371 (c)(1),
(2), (4) Date: Aug. 13, 2010

(87) PCT Pub. No.: WO2009/083095
PCT Pub. Date: Jul. 9, 2009

(65) Prior Publication Data
US 2010/0294614 A1   Nov. 25, 2010

(30) Foreign Application Priority Data

Dec. 28, 2007   (DE) .................. 10 2007 063 360

(51) Int. Cl.
F16D 43/28 (2006.01)
F16D 25/02 (2006.01)
F16D 25/12 (2006.01)

(52) U.S. Cl.
USPC ............. 192/85.02; 192/85.63; 417/471; 180/65.51

(58) Field of Classification Search
USPC .................................. 192/85.02, 85.63
See application file for complete search history.

(56) References Cited

U.S. PATENT DOCUMENTS

| | | | | |
|---|---|---|---|---|
| 2,250,327 A | * | 7/1941 | Criner | 192/85.02 |
| 3,211,136 A | * | 10/1965 | Burckhardt et al. | 123/41.12 |
| 3,230,795 A | * | 1/1966 | Mueller | 475/89 |
| 3,749,217 A | | 7/1973 | Bush et al. | |
| 3,987,689 A | * | 10/1976 | Engle | 475/88 |

(Continued)

FOREIGN PATENT DOCUMENTS

DE   35 18 434 A1   11/1986
DE   35 29 278 A1   2/1987

(Continued)

OTHER PUBLICATIONS

PCT International Search Report dated May 8, 2009 for PCT/EP2008/010363, 2008.

(Continued)

*Primary Examiner* — David D Le
*Assistant Examiner* — Colby M Hansen
(74) *Attorney, Agent, or Firm* — Rader, Fishman & Grauer PLLC

(57) ABSTRACT

A hydraulic assembly for actuating a setting unit in a motor vehicle may include at least one hydraulic actuating unit which acts on the setting unit, as well as at least one piston pump with a piston which is displaceably positioned in a housing, wherein, when the piston moves, there is built up a hydraulic pressure for loading the actuating unit. There is provided a driveshaft with an axis of rotation and an eccentric, wherein the eccentric acts on the piston of the at least one piston pump and, when the driveshaft rotates, builds up a hydraulic pressure. Furthermore, the hydraulic assembly may be integrated within a coupling assembly.

14 Claims, 5 Drawing Sheets

(56) References Cited

U.S. PATENT DOCUMENTS

| | | | | |
|---|---|---|---|---|
| 4,193,484 A | * | 3/1980 | Collier | 192/60 |
| 4,624,355 A | * | 11/1986 | Mroz | 192/85.07 |
| 4,730,514 A | | 3/1988 | Shikata et al. | |
| 4,821,604 A | | 4/1989 | Asano | |
| 5,046,595 A | * | 9/1991 | Sumiyoshi et al. | 192/85.02 |
| 7,178,654 B2 | * | 2/2007 | Ronk et al. | 192/85.63 |
| 7,478,998 B2 | | 1/2009 | Dinkel et al. | |
| 2007/0193846 A1 | | 8/2007 | Grunwald et al. | |

FOREIGN PATENT DOCUMENTS

| | | |
|---|---|---|
| DE | 41 02 364 A1 | 7/1992 |
| DE | 10 2004 042 208 A1 | 1/2007 |
| EP | 0 228 697 A1 | 7/1987 |
| GB | 722 269 A | 1/1955 |
| GB | 889 344 A | 2/1962 |
| GB | 2 180 302 A | 3/1987 |
| JP | 63-030657 A | 2/1988 |
| JP | 63-305030 A | 12/1988 |
| WO | WO-2005063542 A1 | 7/2005 |
| WO | WO-2006106891 A1 | 10/2006 |

OTHER PUBLICATIONS

English Abstract of DE 3518434, 1985.
English Abstract for DE 102004042208, 2004.
English Abstract for DE4102364, 1991.
English Abstract for DE3529278, 1985.
English Abstract for JP63030657, 1986.
English Abstract for JP 63305030, 1987.

\* cited by examiner

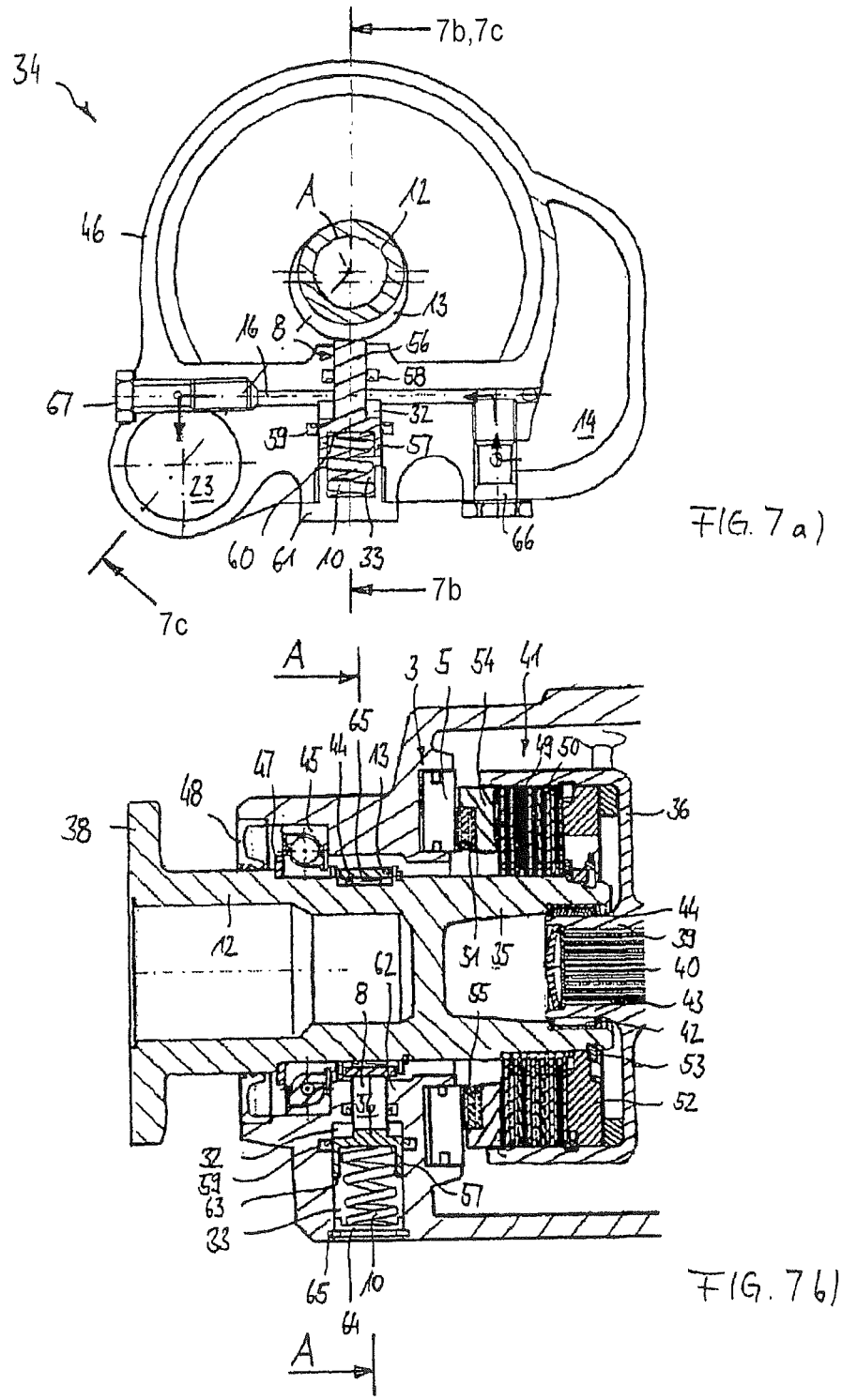

US 8,596,439 B2

HYDRAULIC ASSEMBLY FOR A FORCE-OPERATED SETTING UNIT

CROSS REFERENCE TO RELATED APPLICATIONS

This application is a National Phase of International Application No. PCT/EP2008/010363, filed on Dec. 6, 2008, which claims priority to German Application No. 10 2007 063 360.4 filed on Dec. 28, 2007, which applications are hereby incorporated by reference in their entirety.

BACKGROUND

The disclosure relates to a hydraulic assembly for actuating a force-operated setting unit in a motor vehicle.

Hydraulic assemblies of are known for different applications, for example for actuating locking couplings in differential drives, or for connecting an optionally drivable driving axle of a motor vehicle.

From WO 2005/063542 A1 there is known a hydraulic system in a motor vehicle, having a primary hydraulic circuit and a secondary hydraulic circuit connected thereto. The primary hydraulic circuit comprises a pump for actuating a primary setting cylinder, i.e. a brake cylinder. The secondary hydraulic circuit comprises a secondary setting cylinder which acts on a friction coupling in the driveline of a motor vehicle.

DE 103 49 030 A1 shows a hydraulic axial setting device with a pump for actuating a multi-plate coupling. There is provided a common source of oil for actuating the multi-plate coupling and for cooling and lubricating the multi-plate coupling. The pump is provided in the form of a planetary rotor pump which is driven via an electric motor.

Document GB 889 344 proposes a hydraulic system for a motor vehicle, which comprises a front pump for driving a hydraulic torque converter and a rear pump for occasions when the vehicle is pushed. The rear pump is provided in the form of a piston pump which cooperates with a cam of an output shaft. By rotating the cam, the piston is moved up and down in order to convey fluid into the hydraulic system. When the front pump is stationary, for instance when the motor vehicle engine has been switched off, with the vehicle being pushed, fluid is conveyed by the rear pump. In this way, the rear pump serves as a starting aid for the engine when the vehicle is being pushed.

SUMMARY

A hydraulic assembly for actuating a setting unit in a motor vehicle is disclosed. The hydraulic assembly comprises at least one hydraulic actuating unit which acts on the setting unit; and at least one piston pump with a piston which is displaceably arranged in a housing. As a result of an oscillating movement of the piston, there is applied a hydraulic pressure for loading the actuating unit. A driveshaft is provided with an axis of rotation and an eccentric. The eccentric acts on the piston of the at least one piston pump. A hydraulic pressure is built up when the driveshaft rotates.

Once exemplary advantage of the inventive hydraulic assembly is that the rotational movement of the driveshaft of the motor vehicle can be used for driving the piston pump and thus operate the setting unit as a force-operated assembly. There is thus no need for any further units such as an electric motor, so that the assembly is of a simple construction and requires little space. Moreover, the inventive hydraulic assembly can be arranged close to the setting unit, which also has an advantageous effect on packaging and weight. The hydraulic actuating unit, for example, comprises a piston-cylinder unit with a hydraulic chamber and a setting piston which is displaceably arranged in the hydraulic chamber and which acts on the setting unit of the motor vehicle.

According to one exemplary embodiment, the piston of the at least one piston pump is resiliently loaded towards the driveshaft by a spring mechanism, i.e. against an eccentric outer face of the driveshaft. When the driveshaft rotates, the piston is pretensioned against the force of the spring mechanism. In this way, during the return stroke of the piston, hydraulic fluid is conveyed to the actuating unit, i.e. indirectly by the spring mechanism as a function of the volume required by the actuating unit. The spring force of the spring mechanism defines the maximum pressure which can be generated for loading the actuating unit which, in turn, acts on the setting piston. This is advantageous in that the spring mechanism may be designed according to the pressure requirements. This assembly regulates the maximum pressure because the pump capacity is set by the spring mechanism according to requirements, so that pressure for the actuating unit is limited.

In one exemplary embodiment, the piston pump comprises a first pump chamber which is delimited by the piston and which is hydraulically connected to the actuating unit, with the piston being loaded by the spring mechanism towards the first pump chamber for supplying the hydraulic actuating unit with pressure. The first pump chamber is preferably positioned on a side of the piston which faces away from the spring mechanism and, more particularly, is penetrated by a piston rod of the piston.

In one exemplary embodiment, the eccentric comprises an outer face which is eccentric with reference to the axis of rotation of the driveshaft and against which the piston is pretensioned. According to a alternative arrangement, the eccentric can be provided in the form of a separate sleeve which is rotatably supported on an eccentric outer face of the driveshaft, for instance by a needle bearing or friction bearing. Alternatively, the eccentric can also be formed by a cam-type sliding face at the driveshaft.

In accordance with an alternative arrangement of the disclosure, there can be provided one or more piston pumps for generating a hydraulic pressure. If two piston pumps are used, it is advantageous for these to be arranged at the driveshaft in such a way that they operate in opposite directions. This means that when the piston pump operates during the intake stroke, the other piston pump is in the pressure stroke and vice versa. For example, this can be achieved in that with the two piston pumps being arranged opposite one another, more particularly being in a diametrically opposed position, they are arranged at the driveshaft, with both pump pistons resting against the same eccentric face. According to an alternative arrangement, the two piston pumps can also be arranged so as to axially adjoin one another, in which case the pistons would be in contact with different eccentric faces of the driveshaft. The advantage of using two or more piston pumps consists in that the hydraulic fluid is conveyed continuously to the hydraulic actuating unit. A pumping effect which would be caused by the conveying stroke if one piston pump is used would thus not occur if several piston pumps are used.

According to another exemplary preferred embodiment, there is provided an accumulator assembly with an accumulator chamber. The accumulator chamber is hydraulically connected to the at least one piston pump and can be filled by the piston pump with a hydraulic fluid for generating a pre-pressure. The accumulator assembly is particularly useful for supplying the hydraulic actuating unit with the hydraulic fluid when peak loads occur, because in this way it is possible to meet any requirements which go beyond the volume conveyed by the piston pump.

The accumulator assembly may also comprise a pressure accumulator mechanism which, more particularly, is arranged in the accumulator chamber. The pressure accumulator mechanism can be provided in different embodiments; for instance they can comprise a spring mechanism or a gas store.

The accumulator assembly may also comprises a pressure piston which is displaceably arranged in the accumulator chamber and which can be pretensioned by conveying hydraulic fluid into the accumulator chamber for the purpose of generating a pre-pressure. The pressure piston is preferably loaded by a spring which pretensions the pressure piston against the pressure of the hydraulic fluid. Alternatively, it is also possible to provide a membrane which is positioned in the accumulator chamber and which forms a system boundary between the hydraulic fluid and a storage medium. The storage medium can be gas, for instance, nitrogen.

The piston, which comprises at least one piston pump, is axially displaceably arranged in a housing, wherein the first end face of the piston pump delimits a first pump chamber and wherein the second end face pointing in the opposite direction delimits a second pump chamber. The first pump chamber, which is penetrated by the piston, serves as a high-pressure chamber and supplies the setting piston with hydraulic pressure. The second pump chamber can assume a further function; more particularly it can be designed as a conveying chamber for supplying the force-operated assembly with hydraulic fluid having a lubricating function. Alternatively or in addition, the second pump chamber can also be hydraulically connected to the first pump chamber in order to serve as a loading chamber for supplying the first pump chamber with pressure. In this way, the filling level of the high-pressure chamber, i.e. of the first pump chamber, is improved.

In the connecting channel between the at least one piston pump and the hydraulic chamber of the actuating unit, there is provided at least one setting valve. The at least one setting value can be provided in the form of a proportional valve, i.e. a continuous valve, or a multiple-way valve. The control valve controls the hydraulic pressure and thus, the operating displacement of the setting valve. Furthermore, at least one pressure limiting valve can be provided in the connecting channel. One or more check valves in the connecting channels prevent an undesirable return flow of the conveyed hydraulic fluid.

According to one exemplary embodiment, there is provided a reservoir for the hydraulic fluid, which reservoir is hydraulically connected to the at least one piston pump. Between the reservoir and the pump there is preferably provided a further check valve.

According to a possible further exemplary embodiment, the force-operated setting unit comprises a friction coupling, more particularly an oil-filled multi-plate coupling for connecting a driveline or a locking coupling of a differential drive. Alternatively, the force-operated setting unit can also comprise setting members of an active chassis control unit, more particularly of spring struts or a stabilizer.

A further exemplary arrangement comprises providing a hydraulically operatable coupling assembly for being inserted into a motor vehicle, comprising an inventive hydraulic assembly according to one of the above-mentioned embodiments, the coupling assembly further comprising at least one friction coupling as setting unit which can be actuated by the hydraulic assembly, wherein the friction coupling comprises a first coupling part, a second coupling part rotatable relative to the latter around an axis of rotation, and a pressure plate for loading the friction coupling. The driveshaft of the hydraulic assembly is drivingly connected to one of the two coupling parts, wherein the eccentric of the driveshaft, upon rotation, acts on the piston of the at least one piston pump, with hydraulic pressure being built up for loading the setting piston. This arrangement provides the abovementioned advantages of a simple design which requires little space. The inventive coupling assembly may also comprise two or more friction couplings which are actuated by the inventive hydraulic assembly, examples being an assembly with twin couplings or a combined assembly with a hang-on coupling and a transverse lock.

According to another alternative arrangement, the at least one coupling pump is received in the housing of the friction coupling. Preferably, the hydraulic actuating unit is also accommodated in the housing of the friction coupling, wherein the setting piston, when actuated, acts at least indirectly on the pressure plate. At least indirectly means that between the setting piston and the pressure plate, there can be connected friction-reducing components, for instance an axial bearing. If provided, the accumulator assembly, too, can be arranged in the form of a pressure store in the housing of the friction coupling. The at least one piston pump is preferably arranged so as to axially adjoin the setting piston in the housing and, more particularly, is aligned substantially perpendicularly relative to the axis of rotation. For a simple embodiment with a small number of parts it is advantageous if the driveshaft is integrally connected to the associated coupling part, with the coupling part, more particularly, being provided in the form of a coupling hub. Said embodiments, overall, contribute to a compact design, which, in turn, has an advantageous effect on the weight of the assembly.

BRIEF DESCRIPTION OF THE DRAWINGS

Exemplary embodiments of the disclosure will be illustrated in the drawings and will be described below with reference to the Figures.

Figure 7:
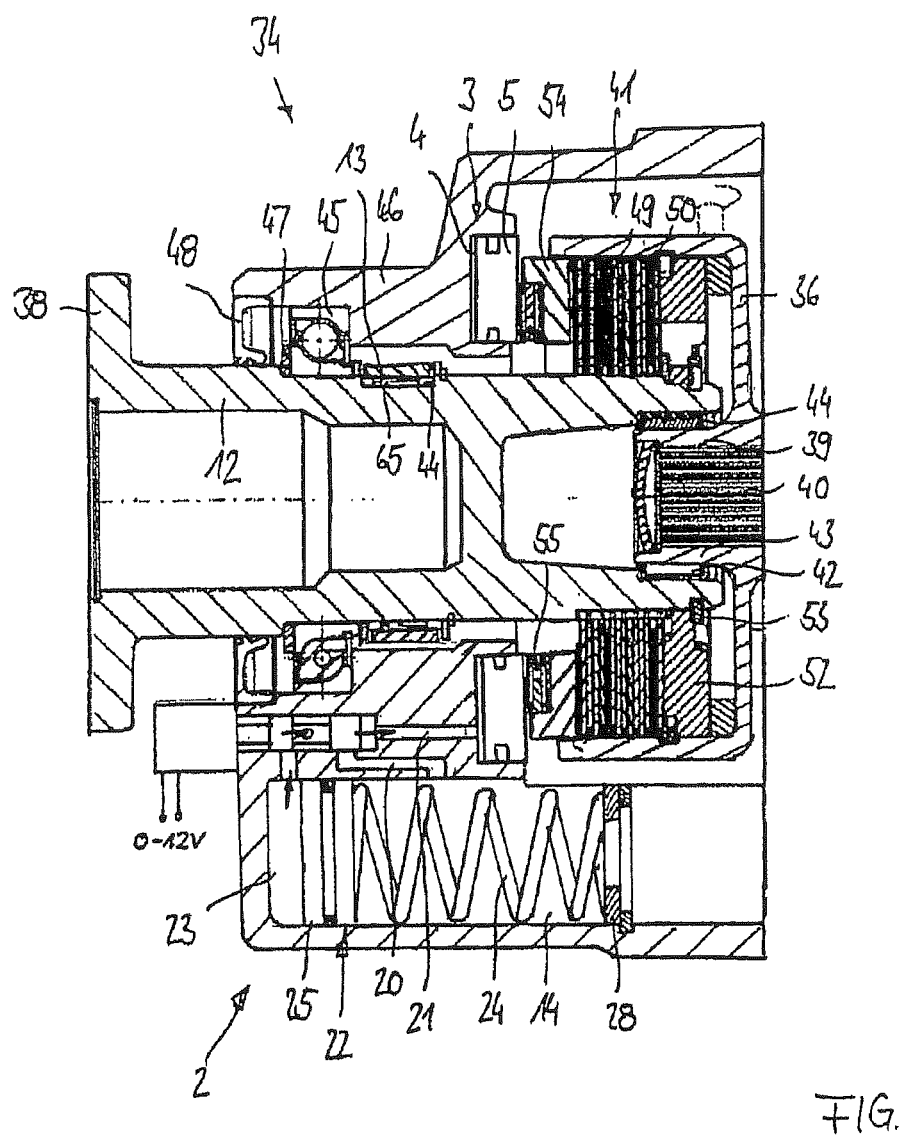
FIG. 7 illustrates a coupling assembly with a hydraulic assembly.

a) in a cross-sectional view along sectional line A-A according to FIG. 7b);

b) in a cross-sectional view along sectional line B-B according to FIG. 7a) with slight modifications;

c) in a cross-sectional view along sectional line C-C according to FIG. 7a) with slight modifications.

DETAILED DESCRIPTION

Figure 1:
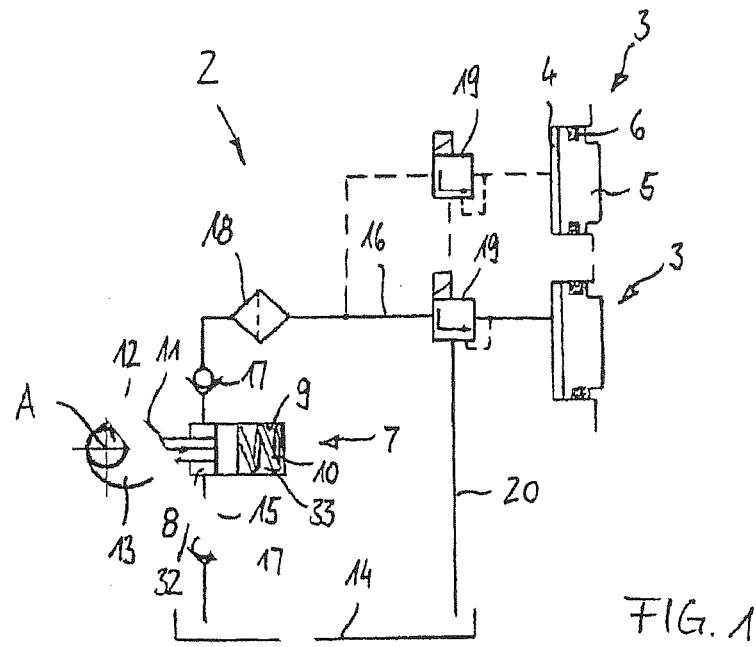
FIG. 1 illustrates a first exemplary embodiment of a hydraulic assembly.

FIG. 1 illustrates a first exemplary embodiment of a hydraulic assembly 2 for actuating a force-operated setting unit or assembly (not shown) of a motor vehicle. The hydraulic assembly 2 comprises at least one hydraulic actuating unit 3 with a hydraulic chamber 4 and a setting piston 5 displaceably inserted into the hydraulic chamber 4. The setting piston 5 is sealed relative to the cylinder wall by an annular seal 6 which is arranged in a circumferential groove of the setting piston 5, and serves to actuate the setting unit (not shown). The hydraulic assembly 2 also comprises a piston pump 7 for generating a hydraulic pressure and applying same to the setting piston 5. The piston pump 7 comprises a piston 8 which is axially movably arranged in a pump housing 9. A spring mechanism, which may be in the form of a spiral spring 10, is recognizable, which loads the piston 8 from the base of the cylinder away towards a driveshaft 12. The driveshaft 12 comprises an eccentric 13 which comprises an outer face which is eccentric relative to the axis of rotation A of the driveshaft 12 and with which the piston 8 is in surface contact. It can be seen that the piston pump 7 comprises a first pump chamber 32 which is delimited by the piston 8 and which, via connecting channels 16, is hydraulically connected to the actuating unit 3, as well as a second pump chamber 33 which accommodates the spring mechanism 10. The first pump chamber 32 is arranged on the side of the pump, which side faces away from the spring mechanism 10, and is penetrated by the piston rod of the piston 8. There are further components in the connecting channels 15, 16, i.e. return valves 17 preventing a return flow of the hydraulic fluid, a filter element 18 and, per hydraulic actuating unit 3, a control valve 19 which, via the return flow channel 20, is hydraulically connected to the reservoir 14.

Said embodiment ensures that, upon rotation of the driveshaft 12 around the axis of rotation A, when the control valves 19 are open, hydraulic fluid is conveyed from the reservoir 14 through the connecting channels 15, 16 into the hydraulic chamber 4, so that the setting piston 5 for actuating the setting unit is axially displaced. By rotating the eccentric 13, the piston 8 is pretensioned against the force of the spring mechanism 10. During the return stroke movement of the piston 8, the spring mechanism 10 generates a pressure, so that hydraulic fluid is conveyed to the actuating unit 3. The spring mechanism is designed in such a way that the conveying pressure for the actuating unit 3 is limited to a maximum value. In consequence, the pump capacity, as a result of the spring mechanism 10, is set to meet requirements, thus ensuring a limited pressure for the actuating unit 3.

Figure 2:
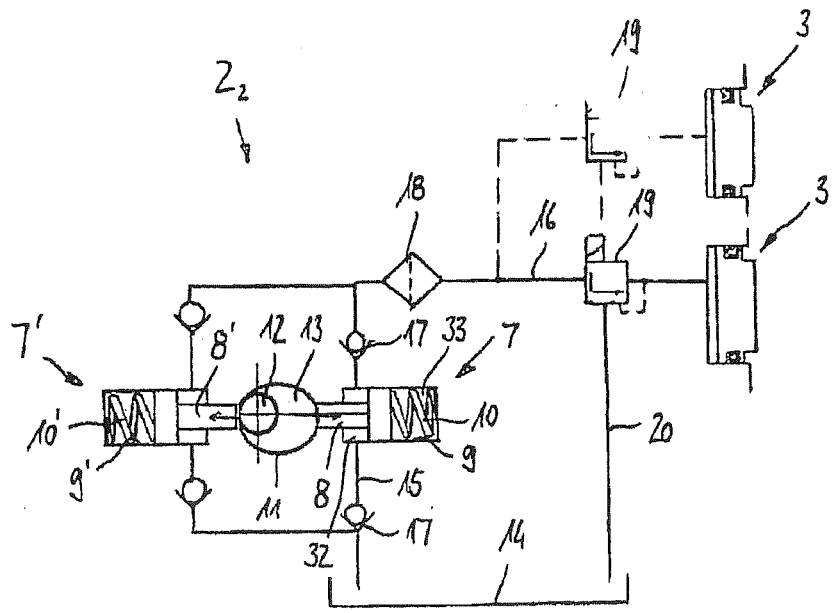
FIG. 2 illustrates a second exemplary embodiment of a hydraulic assembly with two pumps.

FIG. 2 shows a second exemplary hydraulic assembly $2_2$ embodiment which largely corresponds to that shown in FIG. 1. To that extent, reference can be made to the description of same, with identical components having been given the same reference numbers. Below, particular attention will be paid to the special features of the present embodiment according to FIG. 2.

It can be seen that there are provided two piston pumps 7, 7' which are arranged opposite one another. The two piston pumps 7, 7' are arranged in such a way that they operate in opposite directions. During the pressure stroke of the first piston pump 7 the second piston pump 7' is in the suction stroke condition and vice versa. In this way, a continuous flow of fluid is generated towards the hydraulic chamber 4 of the piston/cylinder unit 3, so that the setting unit can be actuated more quickly. The two piston pumps 7, 7' are arranged opposite one another and cooperate with the same eccentric face 11. However, it is also feasible for the driveshaft to comprise a plurality of axially and circumferentially offset eccentric faces, so that the pumps can also be arranged side by side.

Figure 3:
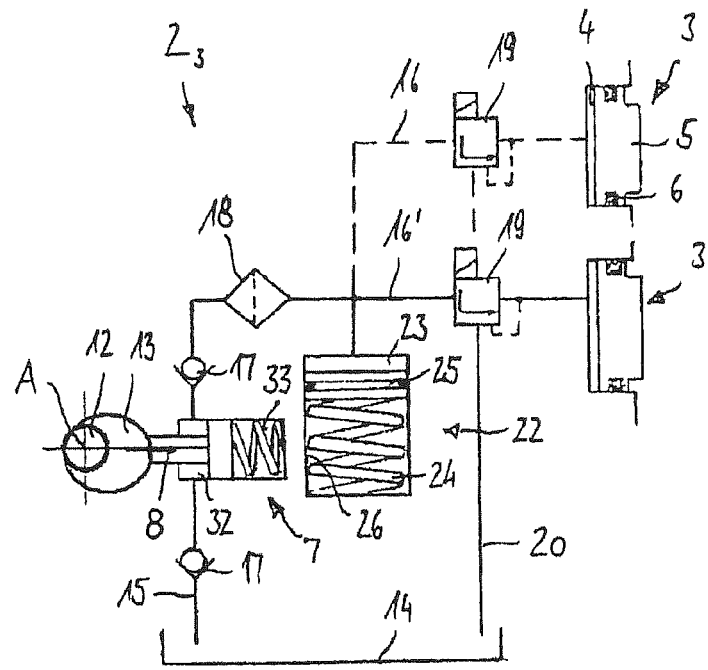
FIG. 3 illustrates a third exemplary embodiment of a hydraulic assembly with a pressure accumulator.

FIG. 3 shows a third embodiment of an inventive hydraulic assembly $2_3$ which also largely corresponds to that shown in FIG. 1. To that extent, reference can be made to the description of same, with identical components having been given the same reference numbers. Below, particular attention will be paid to the special features of the present embodiment according to FIG. 3.

The present embodiment is characterized in that the accumulator assembly 22 is integrated in the form of the pressure accumulator into the hydraulic system. The accumulator assembly 22 comprises an accumulator chamber 23 which is hydraulically connected via the connecting channel to the pump 7 on the one hand and to the hydraulic chamber 4 on the other hand. When the driveshaft 12 rotates around the axis of rotation A, the piston pump 7 conveys hydraulic fluid into the accumulator chamber 23 against the force of the resilient spring mechanism 24. A pressure piston 25 which is axially movably arranged in the pressure cylinder 26 provides a system boundary between the accumulator chamber 23 and the receiving chamber for the spring mechanism 24. As a result of the accumulator assembly 22 there is made available a larger volume of hydraulic fluid which, if necessary, can be used for loading the hydraulic actuating unit 3, which is particularly suitable for dealing with peak loads if an increased amount of hydraulic pressure oil is required.

Figure 4:
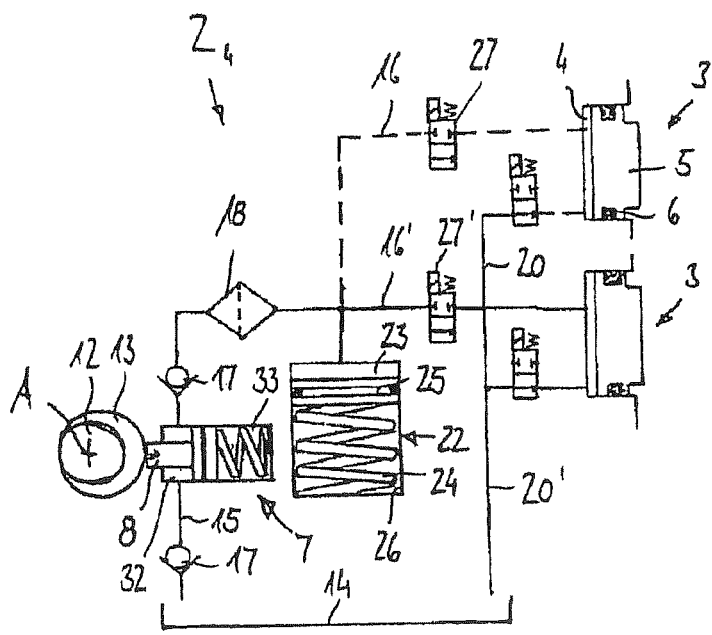
FIG. 4 illustrates a fourth embodiment of a hydraulic assembly with a pressure accumulator and multi-way valves.

FIG. 4 shows a fourth embodiment of an inventive hydraulic assembly $2_4$ which largely corresponds to that shown in FIG. 1. To that extent, reference can be made to the description of same, with identical components having been given the same reference numbers. In the present embodiment according to FIG. 4, the only difference is that the control values are provided in the form of multi-way valves 27 instead of proportional valves. It can be seen that per setting piston 5 there is provided a supply channel 16, 16' and a discharge channel 20, 20', each having a multi-way valve 27. The multi-way valves 27 are provided in the form of 2/2 multi-way valves. In the valve position as shown, the multi-way valves 27 in the supply channels 28 are closed, whereas the multi-way valves 27 in the discharge channels 29 are open. In this position, the setting pistons 5 are not loaded by hydraulic fluid, so that the force-operated setting unit of the motor vehicle is released.

Figure 5:
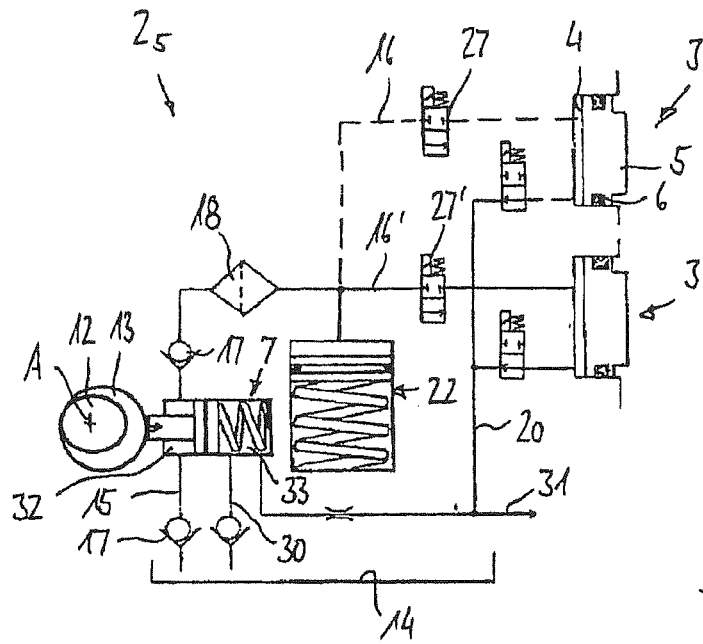
FIG. 5 illustrates a fifth embodiment of a hydraulic assembly indicating the additional function of a low-pressure chamber of the pump.

FIG. 5 shows a fifth embodiment of an inventive hydraulic assembly $2_5$ which largely corresponds to that shown in FIG. 4. To that extent, reference can be made to the description of same, with identical components having been given the same reference numbers. Below, particular attention will be paid to the special features of the present embodiment according to FIG. 5.

It can be seen that at the piston pump 7 there are provided two connecting channels 15, 30 which hydraulically connect the first, and respectively, the second pump chamber 32, 33 to the reservoir 14. In addition, there is provided a further channel 31 which ends in the second pump chamber 33 and which, by its second end (not illustrated) is connected to the force-operated setting unit, for example for lubricating and cooling of movable components. The first pump chamber 32, which is penetrated by the piston 8, forms the high-pressure chamber for supplying the setting piston 5 with pressure. To that extent, the piston pump 7 according to the present embodiment fulfils a double function, i.e. it is conveying hydraulic fluid to the hydraulic chamber 4 of the hydraulic actuating unit 3, thus actuating the setting unit on the one hand and supplying the setting unit with hydraulic fluid, more particularly, lubricant, on the other hand. With reference to the first pump chamber 32, in the course of the pressure stroke, hydraulic fluid is conveyed towards the accumulator chamber 22, respectively the setting piston, while, in the course of the suction stroke, hydraulic fluid is conveyed through the channel 31 to the setting unit.

Figure 6:
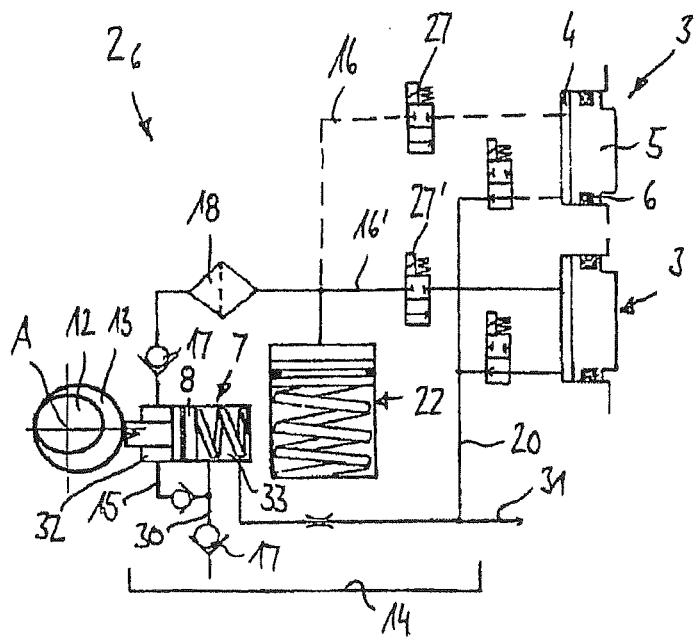
FIG. 6 illustrates a sixth embodiment of a hydraulic assembly, indicating the additional function of a low-pressure chamber of the pump.

FIG. 6 shows a sixth embodiment of an inventive hydraulic assembly $2_6$ which largely corresponds to that shown in FIG. 5. To that extent, reference can be made to the description of same, with identical components having been given the same reference numbers. Below, particular attention will be paid to the special features of the present embodiment according to FIG. 6.

In the present embodiment, the conveying channel 15 of the first pump chamber 32 is hydraulically connected to the second pump chamber 33, so that the second pump chamber 33 serves as the loading chamber for the first pump chamber 32. This design improves the filling level of the first pump chamber 32 used as the high-pressure chamber, which, overall, positively affects the reaction time required for actuating the setting unit.

FIGS. 7a to 7c will now be described jointly. These figures show an inventive coupling assembly 34 for coupling and uncoupling a first coupling part 35 to a second coupling part 36 in the driveline of a motor vehicle, with the second coupling part 36 being rotatable relative to the first coupling part. The coupling assembly 34 serves for drivingly connecting a second driving axle of the motor vehicle. The first coupling part 35 is provided in the form of a coupling hub which is integrally connected to a first driveshaft 12. At its end, facing away from the friction coupling 41, the driveshaft 12 comprises a flange 38 for introducing torque. The second coupling part 36 is provided in the form of a coupling cage which comprises a hub 39 with inner teeth 40 which can be inserted in a rotationally fixed way into a second driveshaft (not illustrated). The second coupling cage 36 is rotatably supported on the axis of rotation A relative to the first coupling part 35 by a radial bearing 42. For this purpose, the hub 39 of the coupling carrier 36 comprises an axial projection which is rotatably held in an axial bore 43 of the first coupling part 35. The first coupling part 35 and the first driveshaft 12 are rotatably supported by a rolling contact bearing 45 in a stationary housing 46 around the axis of rotation A and are axially supported relative to same by a securing ring 47. Toward the outside, the annular chamber formed between the housing 46 and the first driveshaft 12 is sealed by a radial shaft sealing ring 48.

The friction coupling 41 is provided in the form of an oil-filled multi-plate coupling and comprises first plates 49 which are connected to the first coupling part 35 in a rotationally fixed and axially displaceable way and second plates 50 which are connected to the second coupling part 36 in a rotationally fixed and axially displaceable way. The first and the second plates 49, 50 are arranged so as to alternate in the axial direction and jointly form a plate package. The plate package is axially supported against a supporting disc 52 which, by a securing ring 53, is axially fixed to the first coupling part 35.

For actuating the friction coupling 41, there is provided an axially displaceable pressure plate 54 which is arranged coaxially relative to the axis of rotation A and can act on the plate package 49, 50. For actuating the friction coupling 41, use is made of the inventive hydraulic assembly 2 which, in principle, can be designed in accordance with any one of the embodiments diagrammatically illustrated in FIGS. 1 to 6. In the present coupling assembly 34 there is provided a hydraulic assembly 2 with a piston pump 7 and a pressure accumulator 22.

It is possible to see the hydraulic actuating unit 3 with the hydraulic chamber 4 and setting pistons 5 displaceably arranged therein. The setting piston 5 is provided in the form of an annular piston, and, accordingly, the hydraulic chamber 4 extends annularly around the axis of rotation A. For loading the pressure plate 54, there is provided an axial bearing 55 which is radially held in an annular recess 51 of the pressure plate 54. The inner and the outer circumferential face of the setting piston 5 are each sealed by an annular seal 6 relative to the cylinder wall.

FIGS. 7a) and 7b) also show the piston pump 7 of the hydraulic assembly 2. The piston 8 is provided in the form of a stepped piston which comprises a first portion 56 with a smaller diameter and an adjoining second portion 57 with a greater diameter. The pump cylinder 9 is also stepped and comprises a first cylinder portion 62 with a smaller diameter and a second cylinder portion 63 with a greater diameter. The cylinder 9 is provided in the form of a bore in the housing 46, which bore extends radially inwardly from the outer circumferential face of the housing 46. There are provided annular seals 58, 59 which engage annular grooves in the housing 46 and seal the piston 8 relative to the cylinder wall. At its underside, the piston 8 comprises a recess 60 which partially receives the spring mechanism 10, which may be in the form of a spiral spring. In the embodiment according to FIG. 7a), the spring mechanism 10 is supported on the base of a screw 61 which is threaded into the threaded bore. In the embodiment according to FIG. 7b), the spring mechanism 10 is supported against a cover 54 which is arranged in the cylinder bore and is fixed by a securing ring 65.

In accordance with the embodiment of FIG. 7b, the driveshaft 12 comprises a circumferential face 44 which is eccentric relative to the axis of rotation A and on which a sleeve is rotatably supported by a radial bearing 66. To that extent, the sleeve forms the eccentric 13 against which the piston 8, on its end face, is pretensioned by the spring mechanism 10. In principle, the eccentric 13 can also be provided in the form of an entirely eccentric sliding face of the driveshaft 12, i.e. without a bearing and sleeve, as illustrated in FIG. 7a).

In the cross-section as shown in FIG. 7a, the flow of the hydraulic fluid while the accumulator assembly is being filled is indicated by arrows. When the driveshaft 12 rotates, the piston pump 8 conveys hydraulic fluid from the reservoir 13 through the check valve 66, the connecting channel 15 and the check valve 67 into the accumulator chamber 23 of the accumulator assembly 22. As a result, a hydraulic pressure whose level depends on the spring force of the spring mechanism of the accumulator assembly 22 is built up in the accumulator chamber 23. If the spring mechanism has been pretensioned to its maximum, the piston 8 of the piston pump 7 remains in the lower dead center position, as shown here, during the rotation of the driveshaft 12. Only after the friction coupling 41 has been closed and after the pressure in the accumulator chamber has decreased accordingly, does the piston pump 7 again convey hydraulic fluid.

The longitudinal section according to FIG. 7c), which corresponds to the sectional line C-C according to FIG. 7a), shows an electrically controlled control valve 19 which, via the connecting channel 16, is connected to the accumulator assembly 22 and, via the connecting channel 21, to the hydraulic chamber 4 of the hydraulic actuating unit 3. Furthermore, there is shown a return channel 20 which, via the valve chamber, connects the hydraulic chamber 4 to the reservoir 14 which, in this embodiment, is formed in the accumulator assembly 22. The channel connecting the piston pump 7 to the accumulator assembly 22 is located in a different sectional plane and is therefore not visible. Of the accumulator assembly 22, there can be seen the accumulator chamber 23, the axially displaceable pressure piston 25 and the spring mechanism 24 which loads the pressure piston 25 towards the accumulator chamber 23. The spring mechanism 24 may be provided in the form of a spiral spring which is axially supported on the housing wall 46 via a supporting disc 28 and a securing ring 29.

As already described above, the piston pump 7, upon rotation of the driveshaft 12 around the axis of rotation A, conveys hydraulic fluid into the accumulator chamber 23 against the force of the resilient spring mechanism 24. In a driving situation where the two driveshafts have to be connected to one another for the purpose of transmitting torque, i.e. when the friction coupling 41 has to be closed, the control valve 19 is transferred into a position in which the accumulator chamber 23 is connected to the hydraulic chamber 4. As a result, the piston 5 is moved towards the friction coupling 41 and loads the plate package 49, 50 via the axial bearing 56 and the pressure plate 54. This position is shown in FIG. 7c) wherein the flow of the hydraulic fluid from the accumulator chamber 23 via the control valve 19 to the hydraulic chamber 4 is indicated by arrows. For opening the friction coupling 41, the control valve 19 is transferred into a switched position in which the hydraulic chamber 4 is connected to the reservoir 14, so that via the spring mechanism (not illustrated) the pressure plate 54 is again axially displaced into its starting position.

Once exemplary advantage of employing the inventive coupling assembly 34 with the inventive hydraulic assembly 2 is that the rotational movement of the driveshaft 12 can be used for driving the piston pump 7 and thus for actuating the coupling 41. The coupling assembly 34 thus comprises a simple design and requires little space. By dimensioning the spring mechanism 10, 24 of the piston pump 7 and of the accumulator assembly 22 respectively, it is possible to define the pressure which has to be made available for actuating the friction coupling 41.

What is claimed is:

1. A hydraulic coupling assembly for a driveline of a motor vehicle, comprising:
   a hydraulic assembly and at least one friction coupling which can be actuated by the hydraulic assembly,
   wherein the hydraulic assembly comprises at least one hydraulic actuating unit, at least one piston pump with a piston which is displaceably arranged in a housing, wherein, as a result of an oscillating movement of the piston, there is built up a hydraulic pressure for loading the at least one actuating unit, and a driveshaft with an axis of rotation and an eccentric;
   wherein the friction coupling comprises a first coupling part, a second coupling part which is rotatable relative to said first coupling part around the axis of rotation, and a pressure plate for loading the coupling parts, wherein the driveshaft of the hydraulic assembly is drivingly connected to one of the two coupling parts;
   wherein the eccentric of the driveshaft acts on the piston of the at least one piston pump such that a hydraulic pressure is built up when the driveshaft rotates, said hydraulic pressure loading the at least one hydraulic actuating unit for actuating the at least one friction coupling;
   wherein a spring mechanism resiliently loads the piston of the at least one piston pump towards the driveshaft, and the piston is pretensioned against a force of the spring mechanism upon rotation of the driveshaft;
   wherein the spring mechanism is configured such that, during a return stroke movement of the piston, hydraulic fluid is conveyed to the hydraulic actuating unit, depending on a volume requirement;
   wherein the piston pump comprises a first pump chamber which is delimited by the piston and which is hydraulically connected to the hydraulic actuating unit, wherein the spring mechanism loads the piston toward the first pump chamber to supply the hydraulic actuating unit with pressure;
   wherein the first pump chamber is positioned on a side of the piston that faces away from the spring mechanism; and
   wherein there is provided an accumulator assembly with an accumulator chamber, wherein the accumulator chamber is hydraulically connected to the first pump chamber of the at least one piston pump and can be filled by the at least one piston pump with a hydraulic fluid for generating a pre-pressure during a return stroke movement of the piston; wherein the driveshaft is integrally connected to one of the first coupling part or the second coupling part.

2. A hydraulic coupling assembly according to claim 1, wherein:
   the spring mechanism is designed in such a way that a conveying pressure for loading the hydraulic actuating unit is limited to a defined value.

3. A hydraulic coupling assembly according to claim 1, wherein:
   there are provided two piston pumps that are arranged at the driveshaft in such a way that they operate in opposite directions.

4. A hydraulic coupling assembly according to claim 1, wherein:
   the at least one piston pump comprises a second pump chamber that is provided in the form of a conveying chamber for supplying the at least one friction coupling with hydraulic fluid that serves as a lubricant.

5. A hydraulic coupling assembly according to claim 1, wherein:
   a second pump chamber is hydraulically connected to the first pump chamber in order to serve as a conveying chamber for supplying the first pump chamber with pressure.

6. A hydraulic coupling assembly according to claim 1, wherein:
   at least one control valve is provided in a connecting channel between the at least one piston pump and the hydraulic actuating unit.

7. A hydraulic coupling assembly according to claim 1, wherein:
   the friction coupling is a hang-on coupling for connecting a driveline, or a locking coupling of a differential drive.

8. A hydraulic coupling assembly according to claim 1, wherein:
   the at least one piston pump is accommodated in a housing of the friction coupling.

9. A hydraulic coupling assembly according to claim 8, wherein:
   the hydraulic actuating unit is accommodated in the housing of the friction coupling and comprises a setting piston which, when actuated, at least indirectly acts on the pressure plate.

10. A hydraulic coupling assembly according to claim 9, wherein:
    the at least one piston pump is arranged axially adjacent to the setting piston in the housing and is aligned substantially perpendicularly relative to the axis of rotation.

11. A hydraulic coupling assembly according to claim 1, wherein:
    the accumulator assembly is arranged in a housing of the friction coupling.

12. A hydraulic coupling assembly for a driveline of a motor vehicle, comprising:

a hydraulic assembly and at least one friction coupling which can be actuated by the hydraulic assembly, wherein the hydraulic assembly comprises at least one hydraulic actuating unit, at least one piston pump with a piston which is displaceably arranged in a housing, wherein, as a result of an oscillating movement of the piston, there is built up a hydraulic pressure for loading the at least one actuating unit, and a driveshaft with an axis of rotation and an eccentric;

wherein the friction coupling comprises a first coupling part, a second coupling part which is rotatable relative to said first coupling part around the axis of rotation, and a pressure plate for loading the coupling parts, wherein the driveshaft of the hydraulic assembly is drivingly connected to one of the two coupling parts;

wherein the eccentric of the driveshaft acts on the piston of the at least one piston pump such that a hydraulic pressure is built up when the driveshaft rotates, said hydraulic pressure loading the at least one hydraulic actuating unit for actuating the at least one friction coupling;

wherein a spring mechanism resiliently loads the piston of the at least one piston pump towards the driveshaft;

wherein the piston pump is configured such that, during a stroke movement of the piston, the spring mechanism is pretensioned, and that, during a return stroke movement the spring mechanism loads the piston so as to convey hydraulic fluid to the hydraulic actuating unit;

wherein the piston pump comprises a first pump chamber which is delimited by the piston and which is hydraulically connected to the hydraulic actuating unit, wherein the spring mechanism loads the piston toward the first pump chamber to supply the hydraulic actuating unit with pressure; and wherein there is provided an accumulator assembly with an accumulator chamber, wherein the accumulator chamber is hydraulically connected to the first pump chamber of the at least one piston pump and can be filled by the at least one piston pump with a hydraulic fluid for generating a pre-pressure during a return stroke movement of the piston; wherein the driveshaft is integrally connected to one of the first coupling part or the second coupling part.

13. A hydraulic coupling assembly according to claim 12, wherein:

at least one proportional control valve is provided in a connecting channel between the at least one piston pump and the hydraulic actuating unit.

14. A hydraulic coupling assembly for a driveline of a motor vehicle, comprising:

a hydraulic assembly and at least one friction coupling which can be actuated by the hydraulic assembly, wherein the hydraulic assembly comprises at least one hydraulic actuating unit, at least one piston pump with a piston which is displaceably arranged in a housing, wherein, as a result of an oscillating movement of the piston, there is built up a hydraulic pressure for loading the at least one actuating unit, and a driveshaft with an axis of rotation and an eccentric;

wherein the friction coupling comprises a first coupling part, a second coupling part which is rotatable relative to said first coupling part around the axis of rotation, and a pressure plate for loading the coupling parts, wherein the driveshaft of the hydraulic assembly is drivingly connected to one of the two coupling parts;

wherein the eccentric of the driveshaft acts on the piston of the at least one piston pump such that a hydraulic pressure is built up when the driveshaft rotates, said hydraulic pressure loading the at least one hydraulic actuating unit for actuating the at least one friction coupling;

wherein a spring mechanism resiliently loads the piston of the at least one piston pump towards the driveshaft, and the piston is pretensioned against a force of the spring mechanism upon rotation of the driveshaft;

wherein the spring mechanism is configured such that, during a return stroke movement of the piston, hydraulic fluid is conveyed to the hydraulic actuating unit, depending on a volume requirement;

wherein the piston pump comprises a first pump chamber which is delimited by the piston and which is hydraulically connected to the hydraulic actuating unit, wherein the spring mechanism loads the piston toward the first pump chamber to supply the hydraulic actuating unit with pressure;

wherein the first pump chamber is positioned on a side of the piston that faces away from the spring mechanism;

wherein at least one proportional control valve is provided in a connecting channel between the at least one piston pump and the hydraulic actuating unit, and the at least one control valve is hydraulically connected to a reservoir by a return flow channel; wherein the driveshaft is integrally connected to one of the first coupling part or the second coupling part.

* * * * *